(12) United States Patent
Dubiel et al.

(10) Patent No.: US 11,073,180 B2
(45) Date of Patent: Jul. 27, 2021

(54) CONSTANT VELOCITY JOINT WITH COOPERATING BOOT AND SHAFT VENT CHANNELS

(71) Applicant: NEAPCO INTELLECTUAL PROPERTY HOLDINGS, LLC, Farmington Hills, MI (US)

(72) Inventors: Nick Dubiel, Fenton, MI (US); Robert J. Wehner, Livonia, MI (US); Michael Hopson, Clinton Township, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 396 days.

(21) Appl. No.: 16/211,608

(22) Filed: Dec. 6, 2018

(65) Prior Publication Data

US 2019/0178300 A1    Jun. 13, 2019

Related U.S. Application Data

(60) Provisional application No. 62/595,850, filed on Dec. 7, 2017.

(51) Int. Cl.
*F16D 3/84* (2006.01)
*F16D 3/223* (2011.01)

(52) U.S. Cl.
CPC ............. *F16D 3/845* (2013.01); *F16D 3/223* (2013.01); *F16D 2003/22316* (2013.01); *F16D 2003/846* (2013.01); *Y10S 277/928* (2013.01)

(58) Field of Classification Search
CPC ..................... F16D 3/845; F16D 3/223; F16D 2003/22316; F16D 2003/846; Y10S 277/928
USPC .......................................................... 464/17
See application file for complete search history.

(56) References Cited

U.S. PATENT DOCUMENTS

| | | | |
|---|---|---|---|
| 6,179,717 B1 * | 1/2001 | Schwarzler | F16J 3/046 |
| 6,793,584 B2 | 9/2004 | Ramey et al. | |
| 7,677,982 B2 * | 3/2010 | Compau | F16D 3/845 |
| | | | 277/928 |
| 8,834,279 B2 * | 9/2014 | Oh | F16D 3/845 |
| | | | 464/17 |
| 9,206,858 B2 | 12/2015 | Oh | |

\* cited by examiner

*Primary Examiner* — Greg Binda
(74) *Attorney, Agent, or Firm* — Shumaker, Loop & Kendrick, LLP; James D. Miller

(57) ABSTRACT

A constant velocity joint includes a shaft and an inner race coupled to the shaft. The inner race has a shaft groove formed thereon. A boot assembly engages the shaft and covers the inner race. A pair of grooves is axially formed in the boot assembly. The shaft groove provides communication between the pair of grooves.

20 Claims, 3 Drawing Sheets

CONSTANT VELOCITY JOINT WITH COOPERATING BOOT AND SHAFT VENT CHANNELS

CROSS REFERENCE TO RELATED APPLICATIONS

This application claims the benefit of U.S. Provisional Application No. 62/595,850, filed on Dec. 7, 2017. The entire disclosure of the above application is hereby incorporated herein by reference.

FIELD

The present invention relates to joint assemblies and more particularly to an assembly for venting elevated pressure within the joint assemblies.

BACKGROUND OF THE INVENTION

Joint assemblies such as constant velocity joints are common components in automotive vehicles for applications requiring a transmission of rotating motion such as constant velocity motion. Constant velocity joints (CV joints) are typically used to transmit torque from a transmission of a vehicle to final drive components of the vehicle at a constant velocity or speed.

Common types of CV joints include an outer joint member and an inner joint member. The outer joint member typically includes a hollow chamber which is open at one end and closed at an opposing end. The inner joint member is configured to receive a shaft of the vehicle and includes roller assemblies received therein. The outer joint member co-axially receives the inner joint member. A boot is typically employed for sealing the CV joint from outside contaminants such as water, dirt, and other environmental components which can cause damage to the CV joint. Generally, the boot is coupled adjacent to an open end of the outer joint member, covers the inner joint member received in the chamber, and engages the shaft to seal the chamber.

However, during operation of the vehicle, especially during operation at high temperatures, high internal pressure can build up within the chamber of the CV joint. The high internal pressure may cause the boot to deform or expand in a manner that can be detrimental to the durability, sealing, or function of the boot, thus minimizing the effectiveness and longevity of the CV joint. Therefore, it is desired to vent the pressures contained or built up within the chamber of the CV joint to the atmosphere.

Certain systems and structures used to vent the CV joint are complex and difficult to manufacture. For example, some CV joints utilize a complex combination of axially, circumferentially, or helically oriented and continuous vent channels formed along an inside surface of the boot. An example of these complex combinations of vent channels are shown and described in U.S. Pat. No. 6,793,584, the disclosure of which is hereby incorporated herein in its entirety. These complex combinations of channels are not only difficult to manufacture but are prone to deformation as a result of thin cross-sections of the boot created by the vent channels. The thin cross-sections are typically formed at an area of the boot subject to high compression and deformation from an external retention clamp. The clamp is typically employed to engage the boot to the shaft of the inner joint member. The compression and deformation may cause the vent channels to become blocked.

Another prior art system used to vent CV joints relies on axial grooves on the inner surface of the boot. The axial grooves cooperate with a circumferential groove formed on an inner boot sleeve, disposed between the boot and the shaft of the inner joint member, to form a continuous vent path. An example of this prior art system is shown and described in U.S. Pat. No. 9,206,858, the disclosure of which is hereby incorporated herein in its entirety. This system minimizes a complexity of the configuration of the vent paths and increases rigidity of a vent path less prone to deformation in the area of the boot adjacent the external retention clamp. However, the addition of the boot sleeve increases the complexity of assembly by adding components and, as a result, increases manufacturing costs.

Accordingly, there is a desire to for a CV joint including a venting system with maximized rigidity that minimizes complexity, components, and cost of manufacturing.

SUMMARY OF THE INVENTION

In accordance and attuned with the present invention a CV joint including a venting system with maximized rigidity that minimizes complexity, components, and cost of manufacturing, has surprisingly been discovered.

According to an embodiment of the disclosure, a constant velocity joint includes a shaft and an inner race coupled to the shaft. The inner race has a shaft groove formed thereon. A boot assembly engages the shaft and covers the inner race. A pair of grooves is axially formed in the boot assembly. The shaft groove provides communication between the pair of grooves.

According to another embodiment of the disclosure, a constant velocity joint is disclosed. The constant velocity joint includes an outer race defining a chamber, an inner race received in the chamber of the outer race, and a shaft coupled to and extending outwardly from the inner race. A boot assembly engages the outer race and the shaft to enclose the chamber. A single continuous channel provides direct fluid communication between the chamber and the environment or between the chamber and a diaphragm formed at an end of the boot assembly. A first portion of the channel is formed in the boot assembly and a second portion of the channel is formed directly on the shaft.

According to yet another embodiment of the disclosure, a constant velocity joint is disclosed. The constant velocity joint includes an outer race defining a chamber, an inner race received in the chamber of the outer race, and a shaft coupled to and extending outwardly from the inner race. The shaft has a shaft groove formed in an outer surface thereof. A boot assembly engages the outer race and the shaft to enclose the chamber. The boot assembly includes a boot cover engaging the outer race and a boot member engaging the shaft. The boot member includes a first portion and a second portion. The first portion of the boot member extends radially outwardly from the second portion to the boot cover and the second portion directly engages the shaft. A first groove is formed in the inner surface of the second portion of the boot member and a second groove is formed on the inner surface of the second portion of the boot member. The second groove is angularly displaced from the first groove. The shaft groove is in fluid communication with the first groove and the second groove.

BRIEF DESCRIPTION OF THE DRAWINGS

The above advantages of the invention will become readily apparent to those skilled in the art from reading the following detailed description of an embodiment of the invention in the light of the accompanying drawing which is a top perspective view of a portion of a joint and shaft assembly according to an embodiment of the disclosure.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer.

The present technology relates to joint and shaft assemblies, such as constant velocity joints and shafts, used in vehicles. However, the present disclosure can apply to other types of joint and shaft assemblies used in vehicles or in other applications. Joint and shaft assemblies according to the disclosure are configured to facilitate a transmission of rotational forces and torque between components of a vehicle.

Figure 1:
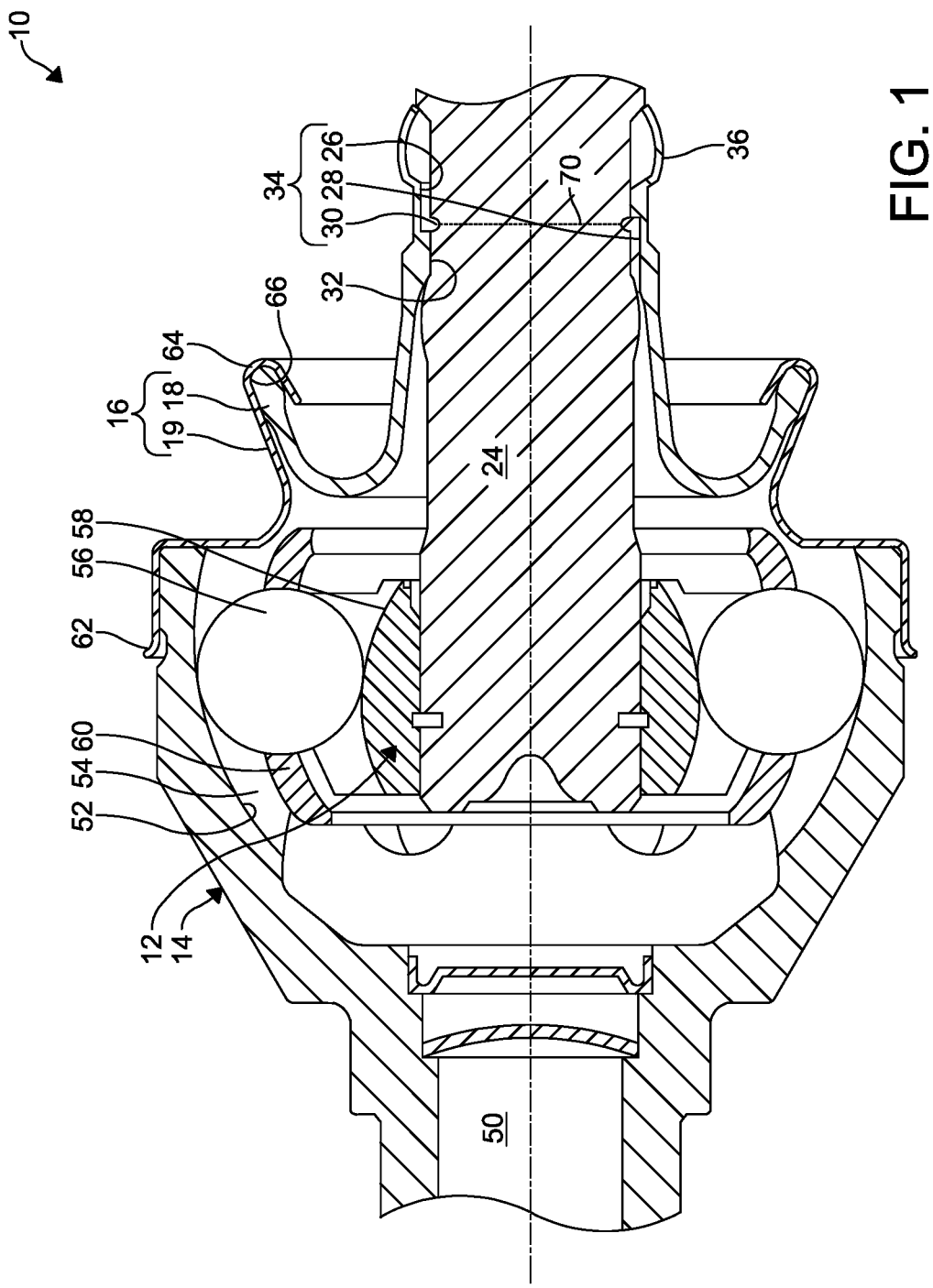
FIG. 1 is a cross-sectional front elevational view of a constant velocity joint according to an embodiment of the disclosure.
Figure 2:
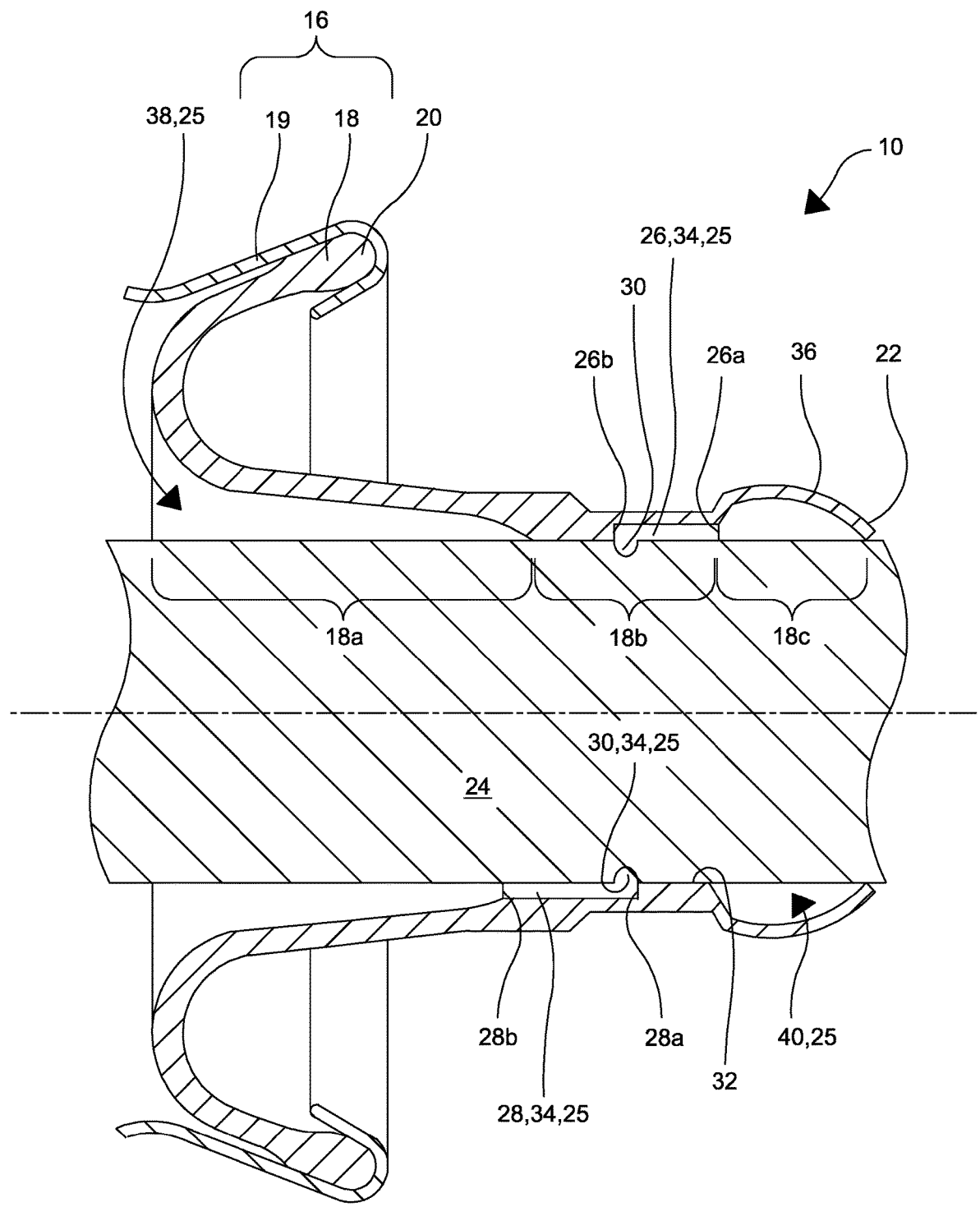
FIG. 2 is a cross-sectional front elevational view of a boot member and a shaft of the constant velocity joint of FIG. 1.

FIGS. 1-2 illustrate a constant velocity (CV) joint 10 according to an embodiment of the instant disclosure. In the embodiment illustrated, the joint 10 is fixed ball-type constant velocity joint. However, the joint 10 can be a tri-pod type velocity joint or any other type of constant velocity joint now known or later developed. Additionally, the joint 10 can be a plunging velocity joint, if desired. The joint 10 includes an inner race 12, an outer race 14, and a boot assembly 16. The outer race 14 has a shaft 50 extending outwardly from one end thereof. An inner wall 52 of the outer race 14 defines a chamber 54 for receiving the inner race 12.

The inner race 12 is coupled to a shaft 24 such as a drive shaft or propeller shaft, for example. A plurality of balls or rolling elements 56 are disposed intermediate an outer surface 58 of the inner race 12 and the inner wall 52 of the outer race 14. The balls 56 are positioned by a cage 60. The balls 56 move along corresponding indentations formed in the inner wall 52 of the outer race 14 and the outer surface 58 of the inner race 12. A rotation of the outer race 14 causes a rotation of the inner race 12 at substantially the same or constant speed. As a result, constant velocity will flow through the joint between two shafts such as the shaft 50 of the outer race 14 and the shaft 24 of the inner race 12. The balls 56 permit the shafts 24, 50 to be angled with respect to each other.

As shown, the boot assembly 16 is formed from two components: a boot member 18 and a boot cover 19. A first end 62 of the boot cover 19 engages an outer surface of the outer race 14. An opposing second end 64 of the boot cover 19 includes a channel 66 formed along an entire periphery of the second end 64 of the boot cover 19.

The boot member 18 is typically formed from a urethane or other rubber material. However, it is understood, the boot member 18 can be formed from any type of hard plastic or soft rubber or any known pliable, flexible, or other material, as desired. A first end 20 of the boot member 18 contacts the boot cover 19 and is secured within the channel 66 of the boot cover 19. An opposing second end 22 of the boot member 18 engages the shaft 24. In certain embodiments, the boot member 18 is secured about the shaft 24 with a boot clamp (not shown). According to another embodiment (not shown), the boot member 18 and the boot cover 19 can be integrally formed to form a unitary boot assembly 16.

The boot assembly 16 is configured to seal the joint 10 and protect the joint 10 from outside contaminants such as water, dirt, particulates, and other undesired materials. The boot member 18 illustrated is typical of a "J-boot" style seal, a diaphragm seal, or bellow seal. However, the boot member 18 according to the instant disclosure is not limited to the aforementioned style of seals. The instant disclosure can be applied to a boot member 18 and boot assemblies 16 of other types such as boot assemblies having boot members with multiple convolutes such as commonly formed from thermoplastic elastomers.

The boot member 18 includes a diaphragm 36 formed adjacent the second end 22 thereof. The diaphragm 36 is pressure-activated and expands to permit undesired high-temperature and/or high-pressure gases formed within the boot assembly 16 to escape from the boot assembly 16. The diaphragm 36 is also a one-way sealing diaphragm to militate against the ingress of water and/or contaminants into the joint 10 while still permitting the egress of undesired high temperature and high pressure gases.

The boot member 18 is generally bell-shaped in cross-section including a first portion 18a angling outwardly from the shaft 24 and extending from the boot cover 19 to a second portion 18b of the boot member 18. The second portion 18b of the boot member 18 engages the shaft 24 to form a seal therewith. A third portion 18c includes the diaphragm 36 adjacent the second end 22 thereof which selectively engages the shaft 24 and expands outwardly from the shaft 24 to release gases from the boot assembly 16.

A vent system 25 is formed intermediate the boot member 18 and the shaft 24. The vent system 25 includes a first groove 26 formed on an inner surface 32 of the boot member 18 and a second groove 28 formed on the inner surface 32 of the boot member 18. The second groove 28 diametrically opposes the first groove 26. However, it is understood, the first groove 26 may be angularly displaced from the second groove 28 by an angle such as greater than or less than 180 degrees, for example. The first groove 26 and the second groove 28 are formed in the inner surface 32 of the boot member 18 along an axial direction thereof and are axially displaced from each other. The first groove 26 extends in the axial direction of the second portion 18b of the boot member 18, wherein a first end 26a of the first groove 26 is directly adjacent the diaphragm 36 and a second end 26b of the first groove 26 is disposed at an intermediate point 70 of the second portion 18b. The second groove 28 extends in the axial direction of the second portion 18b of the boot member 18, wherein a first end 28a of the second groove 28 is disposed at the intermediate point 70 of the second portion 18b and the second end 28b of the second groove 28 is disposed directly adjacent the first portion 18a of the boot member 18. As a result, the second end 26b of the first groove 26 diametrically aligns with the first end 28a of the second groove 28. The intermediate point 70 may be disposed at an equal distance from opposing ends of the second portion 18b or unequal distances from the opposing ends of the second portions 18b.

Figure 3:
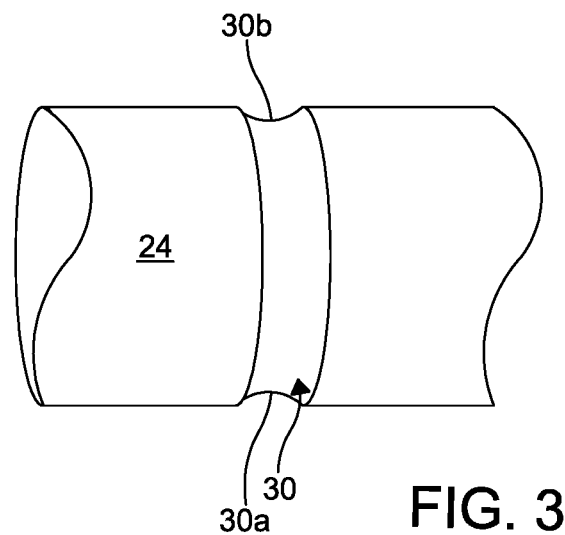
FIG. 3 is a fragmentary perspective view of a portion of the shaft of FIG. 2 with a shaft groove.

The first groove 26 and the second groove 28 cooperate with a shaft groove 30 of the vent system 25 formed in an outer surface of the shaft 24 to form one continuous channel 34 for conveying undesired gases contained within the boot assembly 16 outwardly from the boot assembly 16. The continuous channel 34 accordingly includes a first portion formed in the boot assembly 16 and a second portion formed in the shaft 24, wherein the first portion comprises the first groove 26 and the second groove 28 of the boot assembly 16 and the second portion comprises the shaft groove 30 of the shaft 24. As shown in FIGS. 2-3, the shaft groove 30 is an annular groove or a semi-annular groove formed in a circumferential outer surface of the shaft 24. The shaft groove 30 extends circumferentially between the second end 26b of the first groove 26 and the first end 28a of the second groove 28. However, it is understood in other embodiments the shaft groove 30 can extend intermediate other portions of the respective grooves 26, 28, if desired. The shaft groove 30 provides fluid communication between the grooves 26, 28. Specifically, a surface of the shaft 24 defining the shaft groove 30 is spaced radially inwardly from the surrounding second portion 18b of the boot member 18 to form an open space within the shaft groove 30 between the shaft 24 and the boot 18. This open space extends annularly or semi-annularly around the shaft 24 in a manner wherein a fluid is able to be communicated between a position wherein the first groove 26 intersects the shaft groove 30 and a position wherein the second groove 28 intersects the shaft groove 30. The channel 34 provides fluid communication between a first inner region 38 within the joint 10 and a second inner region 40 beneath the diaphragm 36. The first inner region 38 is the area defined by an area enclosed by the outer race 14 and the boot assembly 16.

Figure 4:
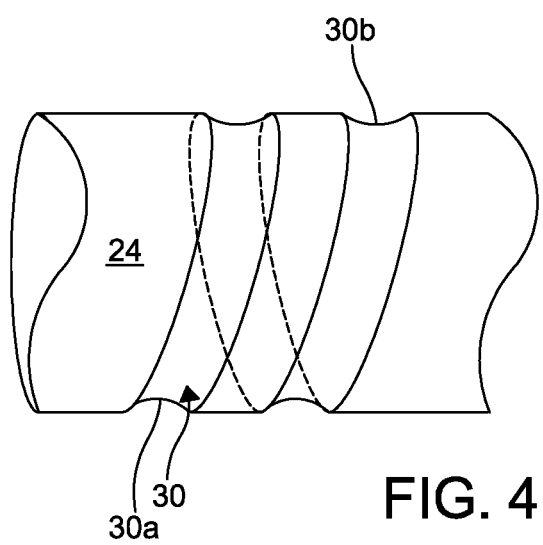
FIG. 4 is a fragmentary perspective view of a portion of a shaft with a shaft groove according to another embodiment of the disclosure.

In other embodiments, as illustrated in FIG. 4, the shaft groove 30 may be helically formed on the shaft 24 or in any other manner to form the continuous channel 34. Where the shaft groove 30 is helically formed on the shaft 24, a first end 30a of the shaft groove 30 aligns with the second end 26b of the first groove 26 and a second end 30b of the shaft groove 30 aligns with the first end 28a of the second groove 28. However, in other embodiments, the first end 30a of the shaft groove 30 can align with any portion of the first groove 26 from the first end 26a to the second end 26b thereof and the second end 30b of the shaft groove 30 can align with any portion of the second groove 28 from the first end 28a, to the second end 28b.

In application, the joint 10 facilitates fluid communication between the first inner region 38 and the second inner region 40 and ultimately the environment or directly between the first inner region 38 and the environment. As a result of the joint 10 according to the disclosure, long and complex venting channels formed directly on the boot assembly 16 is reduced. As a result of the reduced formation of channels or grooves on the boot assembly 16, deformations of the boot assembly 16 is reduced because a thickness of the boot assembly 16 can be substantially maintained where the grooves or channels are not formed. Additionally, multiple components such as shaft sleeves, which may increase costs and complexity of the joint 10, are minimized due to the shaft groove 30 being formed directly to the shaft 24.

In other embodiments, not illustrated, the boot member 18 does not include the diaphragm 36. According to this embodiment, the second inner region 40 is not included and the channel 34 formed by the grooves 26, 28, 30 provides fluid communication between the first inner region 38 and the atmosphere.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A constant velocity joint comprising:
a shaft having a shaft groove formed thereon;
an inner race coupled to the shaft;
a boot assembly engaging the shaft; and
a pair of grooves axially formed in the boot assembly, wherein the shaft groove provides communication between the pair of grooves.

2. The constant velocity joint of claim 1, wherein the shaft groove is an annular groove formed in an outer surface of the shaft.

3. The constant velocity joint of claim 1, wherein the shaft groove is a semi-annular groove formed in an outer surface of the shaft.

4. The constant velocity joint of claim 1, wherein the shaft groove is helically formed in an outer surface of the shaft.

5. The constant velocity joint of claim 1, wherein the pair of grooves is diametrically opposed from each other with respect to the boot member.

6. The constant velocity joint of claim 1, wherein the shaft groove is disposed at the same axial position with respect to an axial direction of the shaft as an end of a first one of the pair of grooves and an end of a second one of the pair of grooves.

7. The constant velocity joint of claim 1, wherein a first one of the pair of grooves is in direct fluid communication with the environment.

8. The constant velocity joint of claim 1, wherein a first one of the pair of grooves is in direct fluid communication with an inner region enclosed by a diaphragm formed at an end of the boot assembly.

9. The constant velocity joint of claim 1, wherein the pair of grooves is formed in a portion of the boot assembly directly engaging the shaft.

10. A constant velocity joint comprising:
an outer race defining a chamber;
an inner race received in the chamber of the outer race;
a shaft coupled to and extending outwardly from the inner race;
a boot assembly engaging the outer race and the shaft to enclose the chamber; and
a single continuous channel providing direct fluid communication between the chamber and the environment or between the chamber and an inner region enclosed by a diaphragm formed at an end of the boot assembly, a first portion of the channel is formed in the boot assembly and a second portion of the channel is formed directly in the shaft.

11. The constant velocity joint of claim 10, wherein the boot assembly includes a boot cover and a boot member, wherein a first end of the boot cover engages an outer surface of the outer race and a second end extends outwardly from the outer race, and wherein a first end of the boot member engages the second end of the boot cover and a second end of the boot member engages the shaft.

12. The constant velocity joint of claim 11, wherein the first portion of the channel is formed in the second end of the boot member engaging the shaft.

13. The constant velocity joint of claim 10, wherein the first portion of the channel includes a first groove formed in an inner surface of the boot assembly along an axial direction of the boot assembly and a second groove formed in the inner surface of the boot assembly along the axial direction of the boot assembly, wherein the first groove is angularly displaced and linearly displaced from the second groove.

14. The constant velocity joint of claim 13, wherein the first groove is diametrically opposed from the second groove.

15. The constant velocity joint of claim 13, wherein the second portion of the channel extends between the first groove and the second groove.

16. The constant velocity joint of claim 10, wherein the second portion of the channel is one of annularly, semi-annularly, and helically formed on the shaft.

17. A constant velocity joint comprising:
an outer race defining a chamber;
an inner race received in the chamber of the outer race;
a shaft coupled to and extending outwardly from the inner race, the shaft having a shaft groove formed in an outer surface thereof;
a boot assembly engaging the outer race and the shaft to enclose the chamber, the boot assembly including a boot cover engaging the outer race and a boot member engaging the shaft, the boot member including a first portion and a second portion, the first portion of the boot member extending radially outwardly from the second portion to the boot cover and the second portion directly engaging the shaft;
a first groove formed in the inner surface of the second portion of the boot member; and
a second groove formed on the inner surface of the second portion of the boot member, the second groove angularly displaced from the first groove, and the shaft groove providing fluid communication between the first groove and the second groove.

18. The constant velocity joint of claim 17, wherein the first groove and the second groove are formed in an axial direction of the boot member.

19. The constant velocity joint of claim 17, wherein the shaft groove is one of annularly, semi-annularly, and helically formed in the outer surface of the shaft.

20. The constant velocity joint of claim 17, wherein the first groove, the second groove, and the shaft groove form a continuous channel providing fluid communication between a first end of the second portion of the boot member and a second end of the second portion of the boot member.

* * * * *